United States Patent
Jang et al.

(10) Patent No.: US 11,892,308 B2
(45) Date of Patent: Feb. 6, 2024

(54) UNCERTAINTY-BASED MAP VISUALIZATIONS FOR DIRECTING VEHICLES

(71) Applicant: GM GLOBAL TECHNOLOGY OPERATIONS LLC, Detroit, MI (US)

(72) Inventors: Joseph Jang, Sterling Heights, MI (US); Evan Stoddart, Grosse Pointe Farms, MI (US); Vladimir Novikov, Tel Aviv (IL); Henry Warren Grasman, Flushing, MI (US); Sean Douglas Vermillion, Austin, TX (US); Rahul Patel, Austin, TX (US); Andrea Rochelle Wharry, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 211 days.

(21) Appl. No.: 17/387,068

(22) Filed: Jul. 28, 2021

(65) Prior Publication Data
US 2023/0032699 A1 Feb. 2, 2023

(51) Int. Cl.
*G01C 21/34* (2006.01)
(52) U.S. Cl.
CPC .............................. *G01C 21/3461* (2013.01)
(58) Field of Classification Search
CPC .. G01C 21/3461; G01C 21/3647; G06F 17/18
See application file for complete search history.

(56) References Cited

U.S. PATENT DOCUMENTS

| 1,106,851 | A | * | 8/1914 | Bukowski | B42F 11/02 281/50 |
|---|---|---|---|---|---|
| 10,219,112 | B1 | * | 2/2019 | Mishra | G06Q 10/083 |
| 2017/0206204 | A1 | * | 7/2017 | Xiong | G06F 16/444 |
| 2018/0087922 | A1 | * | 3/2018 | Wu | G09B 29/106 |
| 2019/0130590 | A1 | * | 5/2019 | Volochniuk | G01B 11/2513 |
| 2021/0108935 | A1 | * | 4/2021 | Koohi | G06Q 10/047 |

OTHER PUBLICATIONS

Dari Maravall, Javier de Lope, "Data clustering using a linear cellular automata-based algorithm", Oct. 26, 2012, Neurocomputing 114 (2013) 86-91. (Year: 2012).*

* cited by examiner

*Primary Examiner* — Khoi H Tran
*Assistant Examiner* — Tristan J Greiner
(74) *Attorney, Agent, or Firm* — CANTOR COLBURN LLP

(57) ABSTRACT

A system for determining and presenting visual representations includes a receiving module configured to receive a set of coordinates representing one or more geographic locations of one or more features of interest, and an analysis module configured to define a region corresponding to the set of coordinates, the region having an extent based on a level of uncertainty associated with the one or more features of interest. The system also includes a visualization module configured to generate a visual representation of the defined region and present the visual representation on a map.

20 Claims, 16 Drawing Sheets

UNCERTAINTY-BASED MAP VISUALIZATIONS FOR DIRECTING VEHICLES

INTRODUCTION

The subject disclosure relates to the art of vehicle navigation and visualization and representation of geographic areas. More particularly, the subject disclosure relates to a system and method for generating map visualizations of regions of interest.

Vehicles (e.g., automobiles, trucks, construction equipment, farm equipment, automated factory equipment, etc.) increasingly rely on digital maps for navigation. For example, users commonly utilize map applications (e.g., mobile applications and/or on-board navigation systems) to select routes for travel. Autonomous operation and semi-autonomous operation (e.g., collision avoidance, adaptive cruise control, automatic braking, etc.), in some contexts, such as data collection, may require that vehicle controllers have access to map information. In some cases, information presented via a map can have a level of uncertainty, which can affect vehicle operation as well as assessments regarding optimal routes to destinations.

SUMMARY

In one exemplary embodiment, a system for determining and presenting visual representations includes a receiving module configured to receive a set of coordinates representing one or more geographic locations of one or more features of interest, and an analysis module configured to define a region corresponding to the set of coordinates, the region having an extent based on a level of uncertainty associated with the one or more features of interest. The system also includes a visualization module configured to generate a visual representation of the defined region and present the visual representation on a map.

In one exemplary embodiment, a system for determining and presenting visual representations includes a receiving module configured to receive a set of coordinates representing one or more geographic locations of one or more features of interest, and an analysis module configured to define a region corresponding to the set of coordinates, the region having an extent based on a level of uncertainty associated with the one or more features of interest. The system also includes a visualization module configured to generate a visual representation of the defined region and present the visual representation on a map.

In addition to one or more of the features described herein, the extent of the defined region is defined by at least one of: a boundary enclosing the defined region, and a network of selected routes traversing the defined region and connecting the set of coordinates.

In addition to one or more of the features described herein, the boundary is determined based on calculating a respective boundary around each coordinate of the set of coordinates, and combining the respective boundaries into the boundary enclosing the defined region, wherein an area of each respective boundary is based on the level of uncertainty.

In addition to one or more of the features described herein, the area of each respective boundary is calculated based on a probability distribution.

In addition to one or more of the features described herein, the defined region is defined based on generating an evolutionary pattern of cellular automata, the pattern based on the level of uncertainty.

In addition to one or more of the features described herein, the set of coordinates is a plurality of coordinates, and the analysis module is configured to determine the defined region based on clustering the plurality of coordinates into one or more clusters, and defining a respective region for each of the one or more clusters.

In addition to one or more of the features described herein, the analysis module is further configured to select a network of routes connecting each coordinate in a cluster based on a route optimization algorithm.

In addition to one or more of the features described herein, the defined region includes a plurality of disparate regions, and the analysis module is configured to determine an optimal entry point into each disparate region, and determine a route between the plurality of disparate regions based on the optimal entry points.

In addition to one or more of the features described herein, the analysis module is further configured to cross-reference the defined region with a statistical characteristic of a geographic region including the defined region, and the visualization module is configured to apply a visual attribute indicative of the statistical characteristic to the visual representation, and overlay the region with the visual representation indicative of the statical characteristic.

In one exemplary embodiment, a method of determining and presenting visual representations includes receiving a set of coordinates representing one or more geographic locations of one or more features of interest, defining a region corresponding to the set of coordinates, the region having an extent based on a level of uncertainty associated with the one or more features of interest, and generating a visual representation of the defined region and presenting the visual representation on a map.

In addition to one or more of the features described herein, the extent of the defined region is defined by at least one of a boundary enclosing the defined region, and a network of selected routes traversing the defined region and connecting the set of coordinates.

In addition to one or more of the features described herein, the boundary is determined based on calculating a respective boundary around each coordinate of the set of coordinates, and combining the respective boundaries into the boundary enclosing the defined region, wherein an area of each respective boundary is based on the level of uncertainty.

In addition to one or more of the features described herein, the area of each respective boundary is calculated based on a probability distribution.

In addition to one or more of the features described herein, the defined region is defined based on generating an evolutionary pattern of cellular automata, the pattern based on the level of uncertainty.

In addition to one or more of the features described herein, the set of coordinates is a plurality of coordinates, and defining the region includes clustering the plurality of coordinates into one or more clusters, and defining a respective region for each of the one or more clusters.

In addition to one or more of the features described herein, the method further includes selecting a network of routes connecting each coordinate in a cluster based on a route optimization algorithm.

In one exemplary embodiment, a vehicle system includes a memory having computer readable instructions and a processing device for executing the computer readable instructions, the computer readable instructions controlling the processing device to perform a method. The method includes receiving a set of coordinates representing one or more geographic locations of one or more features of interest, defining a region corresponding to the set of coordinates, the region having an extent based on a level of uncertainty associated with the one or more features of interest, and generating a visual representation of the defined region and presenting the visual representation on a map.

In addition to one or more of the features described herein, the extent of the defined region is defined by at least one of a boundary enclosing the defined region, and a network of selected routes traversing the defined region and connecting the plurality of coordinates.

In addition to one or more of the features described herein, the boundary is determined based on calculating a respective boundary around each coordinate of the set of coordinates, and combining the respective boundaries into the boundary enclosing the defined region, wherein an area of each respective boundary is based on a probability distribution.

In addition to one or more of the features described herein, the set of coordinates is a plurality of coordinates, and defining the region includes clustering the plurality of coordinates into one or more clusters, defining a respective region for each of the one or more clusters, and selecting a network of routes connecting each coordinate in a cluster based on a route optimization algorithm.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
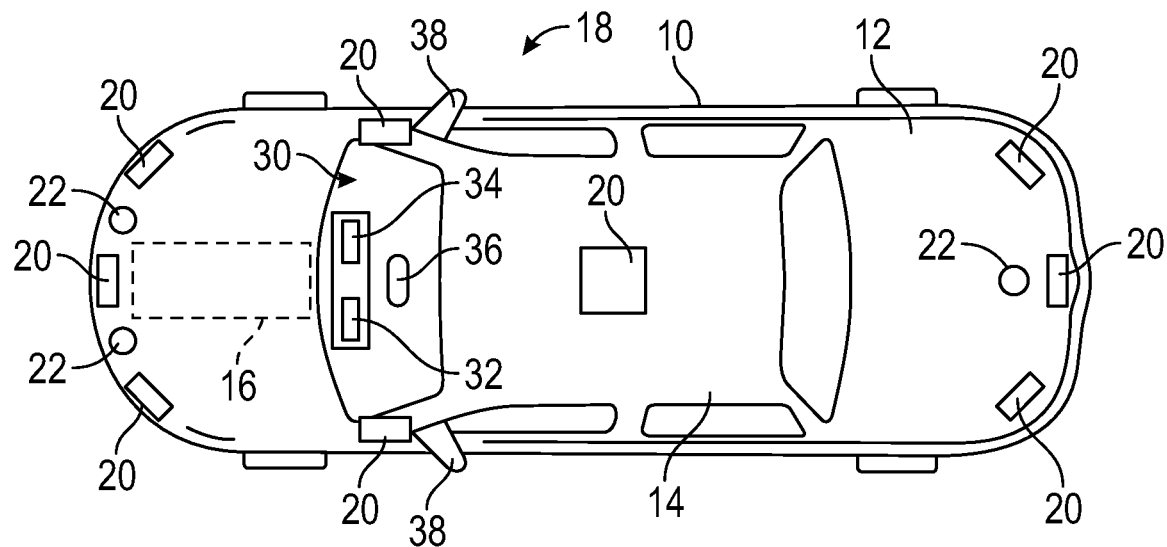
FIG. 1 is a top view of a motor vehicle including aspects of a notification and display system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with one or more exemplary embodiments, methods and systems are provided for visualizing spatial or geographical regions of interest related to one or more geographical coordinates. Such visualizations (e.g., geofences, blobs, etc.) are configured to represent a region that includes features of interest to a user. A "feature of interest" may be any object (e.g., traffic control features, pedestrians, vehicles, potential customers, bars, restaurants, etc.), condition (e.g., population density, type of area, etc.) or event (e.g., social or cultural gatherings) of interest to a user.

Embodiments described herein generate and present a visual representation of a region (also referred to as a "visualization") based on a likelihood of the region including one or more features of interest. The visual representation is generated by defining a region in which a feature or features of interest are known to or likely to exist. The defined region has an extent (e.g., size or area, diameter, radius and/or shape) that is configured to convey a level of uncertainty associated with the feature(s) of interest. Such visualizations facilitate navigation by directing a vehicle to regions of high likelihood while also localizing the region to reduce or minimize areas of lower likelihood.

In an embodiment, a displayed visualization does not specify a specific route, but is rather a bounded or defined geographic region. Multiple display or color methods could be used to represent the visualization, signifying any number of interests for a driver or operator. The defined regions represent areas of significance to a user, such as an engineer who generated them for data collection purposes (e.g., regions grown from traffic positioning locations or areas).

Visualizations or visual representations can be generated and presented in a number of ways, and regions can be defined in a variety of manners. In an embodiment, a region can be defined by a boundary or boundaries that enclose a given area. Visualizations can be configured by applying a homogenous attribute over a defined region (e.g., color), that visualizes the region without specifying or emphasizing specific features. A defined region may be geometric region referred to as a "blob." The defined region can be visualized by overlaying a color or other attribute over the defined region, and/or by highlighting or emphasizing a network of road segments representing all or some possible routes through the defined region, without specifying one specific route.

It is noted that, in some cases a defined region can be visualized via a combination of an overlaid visual attribute and highlighted road segments or routes. The visualizations described herein can be overlaid or otherwise displayed on a map (e.g., on a real-time basis), optionally with a tracking method, to ensure that a vehicle is driving within the defined region.

Visualizations can be used to direct vehicle operation in a variety of contexts. For example, the visualizations can be used to direct data collection vehicles to areas that have a high likelihood of obtaining relevant information, such as traffic control features, structures, road conditions and other features of an area for which data has not yet been collected. In another example, visualizations can be used to convey areas that have a high likelihood of conditions and/or points of interest (e.g., high pedestrian density, high vehicle density, likelihood of the presence of locations of interest, likelihood of the presence of customers, etc.). Vehicles and users can use such information to direct vehicles to such areas, or in some cases to avoid such areas.

FIG. 1 shows an embodiment of a motor vehicle 10, which includes a vehicle body 12 defining, at least in part, an occupant compartment 14. The vehicle body 12 also supports various vehicle subsystems including an engine system 16 (e.g., combustion, electrical, and other), and other subsystems to support functions of the engine system 16 and other vehicle components, such as a braking subsystem, a steering subsystem, and others.

The vehicle also includes a monitoring system 18, aspects of which may be incorporated in or connected to the vehicle 10. The system 18 in this embodiment includes one or more optical cameras 20 configured to take images, which may be still images and/or video images. Additional devices or sensors may be included in the system 18, such as one or more radar assemblies 22 included in the vehicle 10. The system 18 is not so limited and may include other types of sensors, such as infrared cameras and sonar.

The system may be used for monitoring surroundings for vehicle control or safety, and/or used for collecting data around a vehicle 10, such as GPS data, images, road information (e.g., road type, lanes etc.), object location, identifying businesses and structures (e.g., stores), and others.

The vehicle 10 and the system 18 also include an on-board computer system 30 that includes one or more processing devices 32 and a user interface 34. The user interface 34 may include a touchscreen, a speech recognition system and/or various buttons for allowing a user to interact with features of the vehicle. The user interface 34 may be configured to interact with the user via visual communications (e.g., text and/or graphical displays), tactile communications or alerts (e.g., vibration), and/or audible communications. The on-board computer system 30 may also include or communicate with devices for monitoring the user, such as interior cameras and image analysis components. Such devices may be incorporated into a driver monitoring system (DMS).

In addition to the user interface 34, the vehicle 10 may include other types of displays and/or other devices that can interact with and/or impart information to a user. For example, in addition to, or alternatively, the vehicle 10 may include a display screen (e.g., a full display mirror or FDM) incorporated into a rearview mirror 36 and/or one or more side mirrors 38. In one embodiment, the vehicle 10 includes one or more heads up displays (HUDs). Other devices that may be incorporated include indicator lights, haptic devices, interior lights, auditory communication devices, and others.

Figure 2:
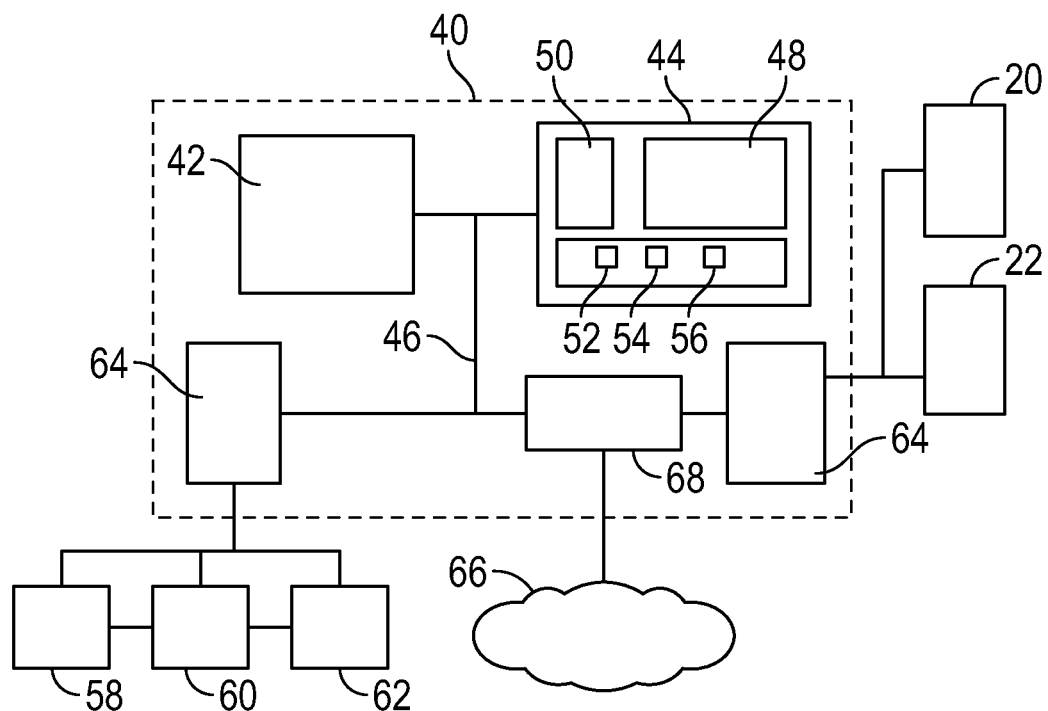
FIG. 2 depicts a computer system configured to perform aspects of map analysis, visualization generation and/or vehicle route planning, in accordance with an exemplary embodiment.

FIG. 2 illustrates aspects of an embodiment of a computer system 40 that is in communication with, or is part of, the monitoring system 18, and that can perform various aspects of embodiments described herein. The computer system 40 includes at least one processing device 42, which generally includes one or more processors for performing aspects of image acquisition and analysis methods described herein. The processing device 42 can be integrated into the vehicle 10, for example, as the on-board processing device 32, or can be a processing device (off-board) separate from the vehicle 10, such as a server, a personal computer or a mobile device (e.g., a smartphone or tablet). The computer system 40 or components thereof may be part of a notification and display system as discussed herein.

Components of the computer system 40 include the processing device 42 (such as one or more processors or processing units), a system memory 44, and a bus 46 that couples various system components including the system memory 44 to the processing device 42. The system memory 44 may include a variety of computer system readable media. Such media can be any available media that is accessible by the processing device 42, and includes both volatile and non-volatile media, and removable and non-removable media.

For example, the system memory 44 includes a non-volatile memory 48 such as a hard drive, and may also include a volatile memory 50, such as random access memory (RAM) and/or cache memory. The computer system 40 can further include other removable/non-removable, volatile/non-volatile computer system storage media.

The system memory 44 can include at least one program product having a set (e.g., at least one) of program modules that are configured to carry out functions of the embodiments described herein. For example, the system memory 44 stores various program modules that generally carry out the functions and/or methodologies of embodiments described herein. A receiving module 52 may be included to perform functions related to acquiring and processing information (e.g., used to assess probabilities or likelihoods of points of interest or conditions of interest), and an analysis module 54 may be included for defining regions (e.g., via boundaries or selection of road networks. A visualization module 56 may also be provided for presenting map data and visualizations, and/or providing a user interface. The system 40 is not so limited, as other modules may be included. The system memory 44 may also store various data structures, such as data files or other structures that store data related to imaging and image processing. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 42 can also communicate with one or more external devices 58 such as a keyboard, a pointing device, and/or any devices (e.g., network card, modem, etc.) that enable the processing device 42 to communicate with one or more other computing devices. In addition, the processing device 42 can communicate with one or more devices such as the cameras 20 and the radar assemblies 22 used for image analysis. The processing device 32 can communicate with one or more display devices 60 (e.g., an onboard touchscreen, cluster, center stack, HUD, mirror displays (FDM) and others), and vehicle control devices or systems 62 (e.g., for partially autonomous (e.g., driver assist) and/or fully autonomous vehicle control). Communication with various devices can occur via Input/Output (I/O) interfaces 64.

The processing device 32 may also communicate with one or more networks 66 such as a local area network (LAN), a general wide area network (WAN), and/or a public network (e.g., the Internet) via a network adapter 68. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

Figure 3:
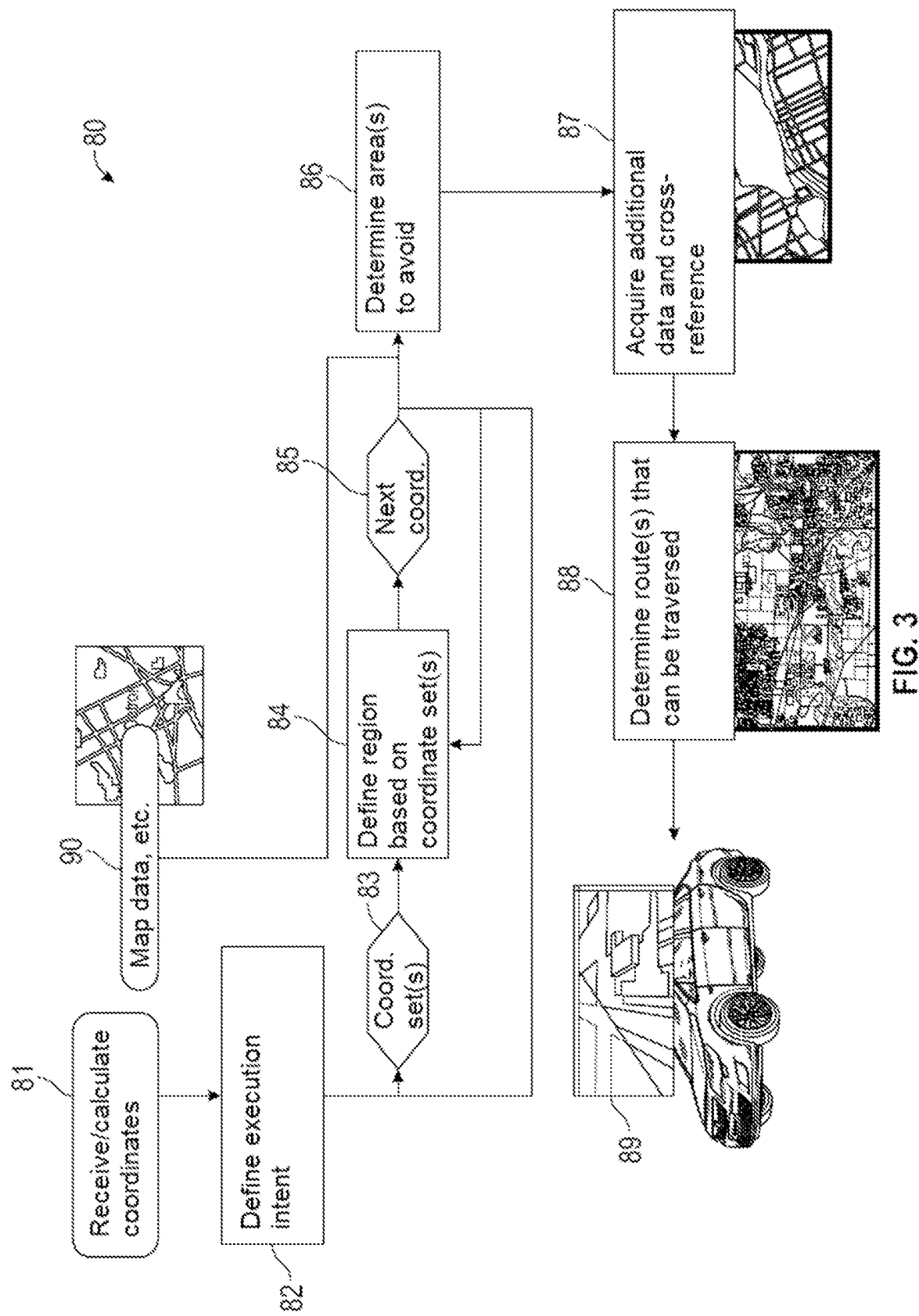
FIG. 3 is a flow diagram illustrating aspects of a method of generating visual representations or visualizations of a geographic or spatial region based on an execution intent, in accordance with an exemplary embodiment, the execution intent related to one or more features of interest (e.g., highlighted road networks and bounded region)

FIG. 3 depicts an embodiment of a method 80 of generating and presenting visual representations or map visualizations. Aspects of the vehicle 10, the computer system 40, or other processing device or system, may be utilized for performing aspects of the method 80. The method 80 is discussed in conjunction with blocks 81-90. The method 80 is not limited to the number or order of steps therein, as some steps represented by blocks 81-90 may be performed in a different order than that described below, or fewer than all of the steps may be performed.

The methods discussed herein are described in conjunction with the vehicle 10, but are not so limited and can be used in conjunction with various vehicles (e.g., cars, trucks, aircraft) and/or other systems (e.g., construction equipment, manufacturing systems, robotics, etc.).

At block 81, a processing device (e.g., the processing device 32 of FIG. 1) receives or calculates coordinates related to points of interest or regions of interest within a given geographic area. Points and regions of interest may include specific geographic coordinates, waypoints or coordinates in one or more suggested or planned routes, or boundaries denoting specific regions. Coordinates may be determined by the processing device or input by a user.

At block 82, an execution intent or intents is/are determined in relation to the received coordinates. An "execution intent" refers to the specific purpose for which the vehicle is to enter a region, and corresponds to one or more features of interest. For example, an execution intent may be to collect data regarding a region or location that can be used to update maps and/or facilitate vehicle navigation. Other examples of execution intent may be to direct a vehicle to areas having a high probability of desired objects, such as pedestrians, vehicles or traffic control features, or having a desired condition such as pedestrian density, vehicle density, road density, and others. In another example, if the execution intent is to collect data regarding potentially unknown features in an area (e.g., road conditions, road features, traffic control features, types of destinations, etc.), the features of interest may include regions of high probability that such features would be encountered. The coordinates may be grouped or partitioned into sets of coordinates based on execution intent and/or proximity to one another (e.g., clustering).

At block 83, if desired, the coordinates may be grouped or otherwise classified into coordinate sets. For example, a set (i.e., one or more) of coordinates may be determined for each execution intent and/or general area. The coordinates can also be grouped by proximity to one another.

At block 84, a geographical or spatial region is defined based on the received coordinates (or a determined set of coordinates) and uncertainty information associated with a feature of interest or execution intent. The uncertainty information may correspond to a probability or level of uncertainty regarding the location or region of a feature of interest. The region may be defined as a geofence, a group of geofences (or other enclosed boundary) and/or defined as a network of routes.

At block 85, if there are more than one coordinate set, the next coordinate set is input and a corresponding region is defined. It is noted that the defined regions may represent the same features of interest, or different features of interest. For example, if a user inputs a number of different execution intents, one or more regions are defined for each intent.

At block 86, there may be areas to avoid, for example, due to safety reasons or because an area within a defined region is known to have a low or zero probability of finding a feature of interest. Areas to avoid may be areas that are not coincident with any calculated boundary. Other information may be used to determine areas to avoid, such as pre-existing map data, pre-defined geofences (block 90), traffic information, construction information and/or any other data indicative of situations or conditions that the vehicle should avoid.

At block 87, additional data is acquired and cross-referenced with calculated boundaries and/or defined regions, which may be used to select visual attributes of a visualization or visual representation. Such data may also be used to solve vehicle routing problems between disparate defined regions. "Disparate" regions are regions that do not intersect or have any coincident coordinates.

In an embodiment, statistical characteristics of a defined region (or geographical area including the defined region) may be acquired. Such characteristics may be provided by a user or determined from any available source of information.

A defined region can be assigned a color or other visual attribute (or combination of visual attribute) that indicates the characteristic and/or differentiates regions having different characteristics, or different values of a characteristic. For example, if population density is a characteristic, visualizations of defined regions having different levels of population density can be assigned respective colors.

At block 88, if there are disparate defined regions, the processing device can determine routes that can be traversed to connect the defined regions and/or direct a vehicle along a route that most efficiently traverses the regions. For example, a vehicle routing problem or other analysis, such as a route optimization algorithm, can be used to calculate routes that connect disparate defined regions.

At block 89, one or more visualizations are presented to a user via, for example, a vehicle display and/or interface system. For example, region geometries and locations are overlaid onto a map display, and visual attributes are added to each region. Examples of visual attributes include color, brightness, shading, texture and/or any other visual attribute that can be used to differentiate the defined region(s) from other regions of the map display. In an embodiment, the visualizations are semi-transparent so that the underlying map features can be discerned by the user. A visual attribute may be homogeneous over an entirety of a given defined region, but is not so limited. In another embodiment, a defined region may be visualized by highlighting a network of possible routes in the defined region. The defined region may be visualized by a highlighted network, alone or in combination with an overlaid attribute.

Visualizations may be presented in real-time as the vehicle is operated. For example, a visualization is displayed in real-time using a 3-D map view visualizer application, with tracing, so that a driver can ensure that driving areas are within the bounds of the visualization.

The following description presents a variety of methods for defining regions of interest based on coordinate information, user intent and uncertainty, and for presenting visualizations of defined regions. In these methods, the level of uncertainty regarding the location and/or existence of a feature or features of interest is used to determine the extent of a respective defined region. The following methods may be performed as part of the method 80, for example as one or more of the method steps represented by one or more of blocks 81-90.

In some of the following embodiments, all or part of the defined regions are defined and bounded by a geofence, or virtual perimeter that can be defined computationally and/or displayed on a map or other representation of a geographic area. It is noted that such embodiments are not limited to geofences, thus reference to a geofence is understood to encompass any suitable boundary. In addition, the shape and size of the defined regions and associated visualizations may be generated using polygonal shapes or any other suitable technique.

In an embodiment, generation of a defined region or regions is based on probability distributions in relation to a feature or features if interest. An embodiment of a method for defining a region includes defining a risk-adjusted geofence (or other boundary) that is calculated based on geospatial probability distributions and a user preference model. The user preference model characterizes a user's risk attitude.

For each coordinate, the likelihood of a feature of interest is modeled based on a likelihood of the feature being located within some distance of the coordinate. This likelihood may be derived from any source of information. The modeled likelihood may be referred to as a user's "belief." The modeling produces a probability distribution as a function of distance from the coordinate.

Figure 4:
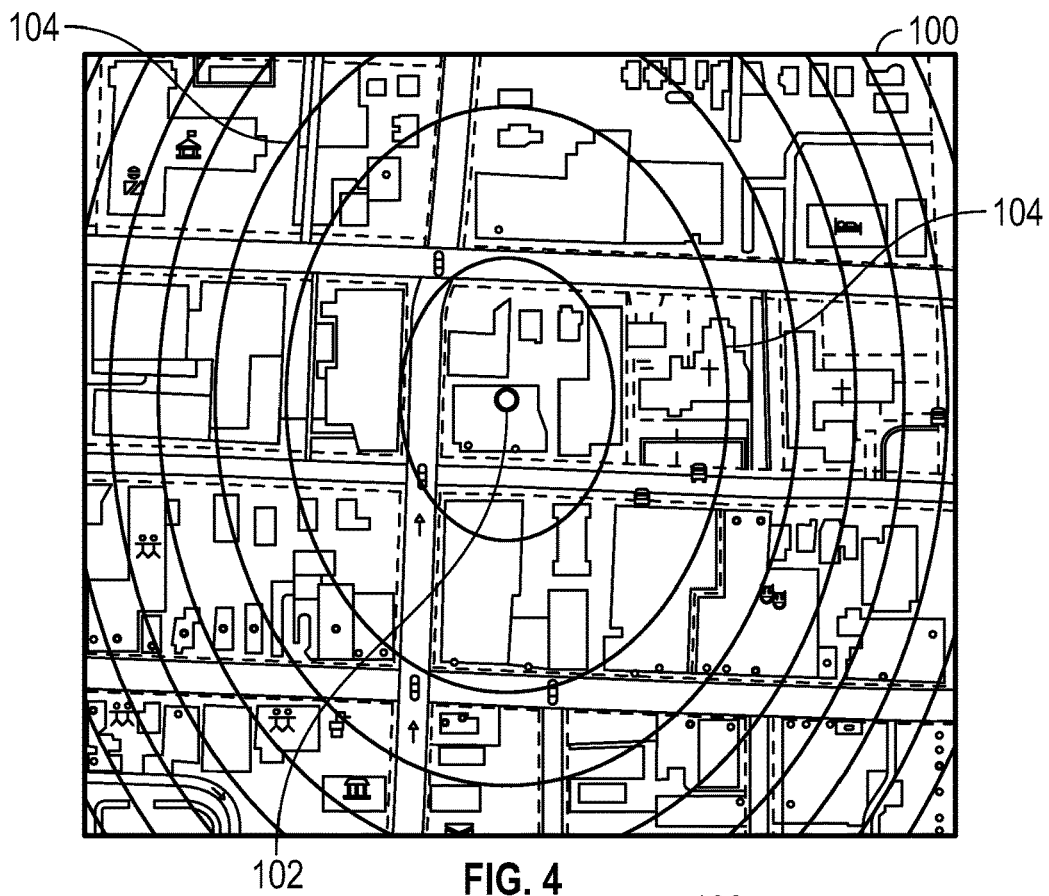
FIG. 4 depicts an example of a probability distribution defined around a coordinate corresponding to a feature or region of interest, in accordance with an exemplary embodiment.

FIG. 4 shows an example of a section of a map 100 including a coordinate 102 (distribution mean) representing or related to a feature of interest, and a plurality of contour lines 104 defining the probability distribution.

In an embodiment, the probability distribution is modeled as a bivariate normal distribution based on two random variables. The random variables in this embodiment are longitude and latitude. The distribution for each coordinate 102 can be represented as contours of constant likelihood or probability.

The user's risk attitude may be modeled as a utility function U(d), where d is a distance away from the coordinate 102 or feature of interest. This represents the user's "preference," or risk tolerance. A greater distance d represents a higher risk tolerance. An example of the utility function can be represented by:

$$U(d) \propto -\exp(-p \times G),$$

where p represents the user's risk tolerance or preference.

In an embodiment, the probability distribution is modeled as a function of distance and a certainty equivalent distance is calculated, the certainty equivalent distance corresponding to the uncertainty of the location of the feature of interest, and increases with increasing uncertainty. The certainty equivalent distance represents the radius around the normal distribution mean and defines an area to search for (or avoid) an uncertain feature of interest (e.g., object or event).

The certainty equivalent distance (d*) is used to define a definitive geofence around the coordinate 102. In this way, an individual respective geofence is defined for each coordinate 102, and the individual geofences are combined to generate an overall geofence boundary that encompasses an area including the coordinates.

Figure 5:
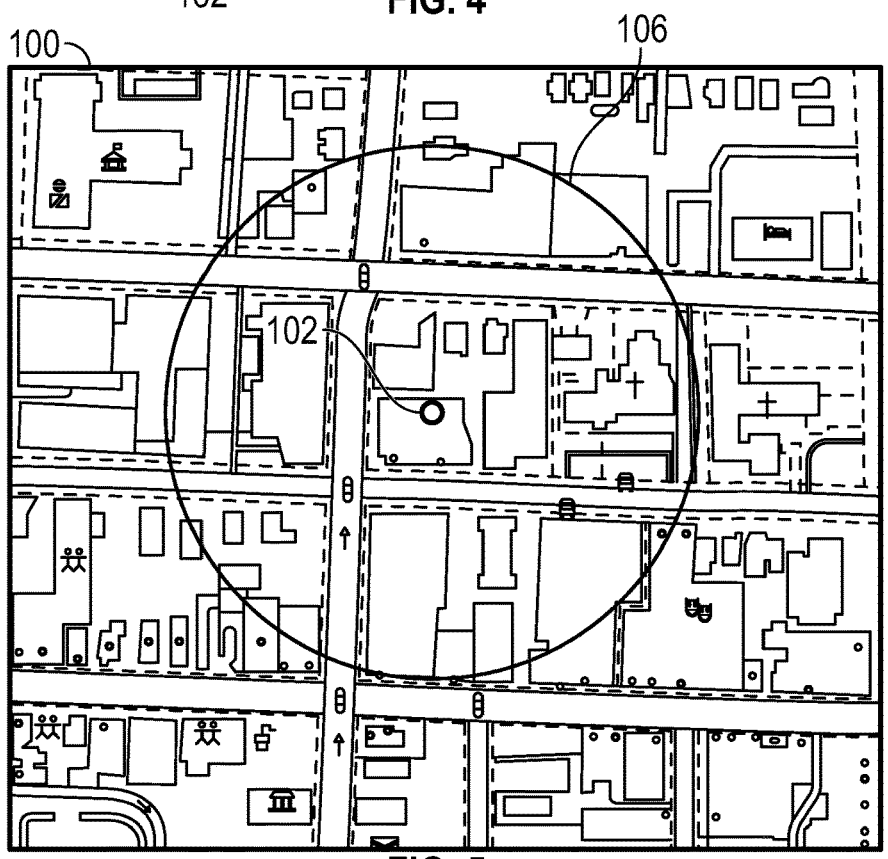
FIG. 5 depicts an example of a boundary generated around the coordinate of FIG. 4, the boundary having a radius based on a level of uncertainty, in accordance with an exemplary embodiment.

For example, referring to FIG. 5, the certainty equivalent distance defines a circular boundary or individual geofence 106 around the coordinate 102. In this example, the probability distribution is modelled as a Raleigh distribution, and the equivalent distance d* is calculated as:

$$d \propto U^{-1}(E[U(d)]),$$

where E[U(d)] is expected utility or expected value and E is an expectation operator.

It is noted that the specific distributions, utility function and calculations are provided for illustrative purposes and are not intended to be limiting. Any of various computational or numeric methods may be used to characterize a probability distribution and individual geofences or boundaries.

Figure 6:
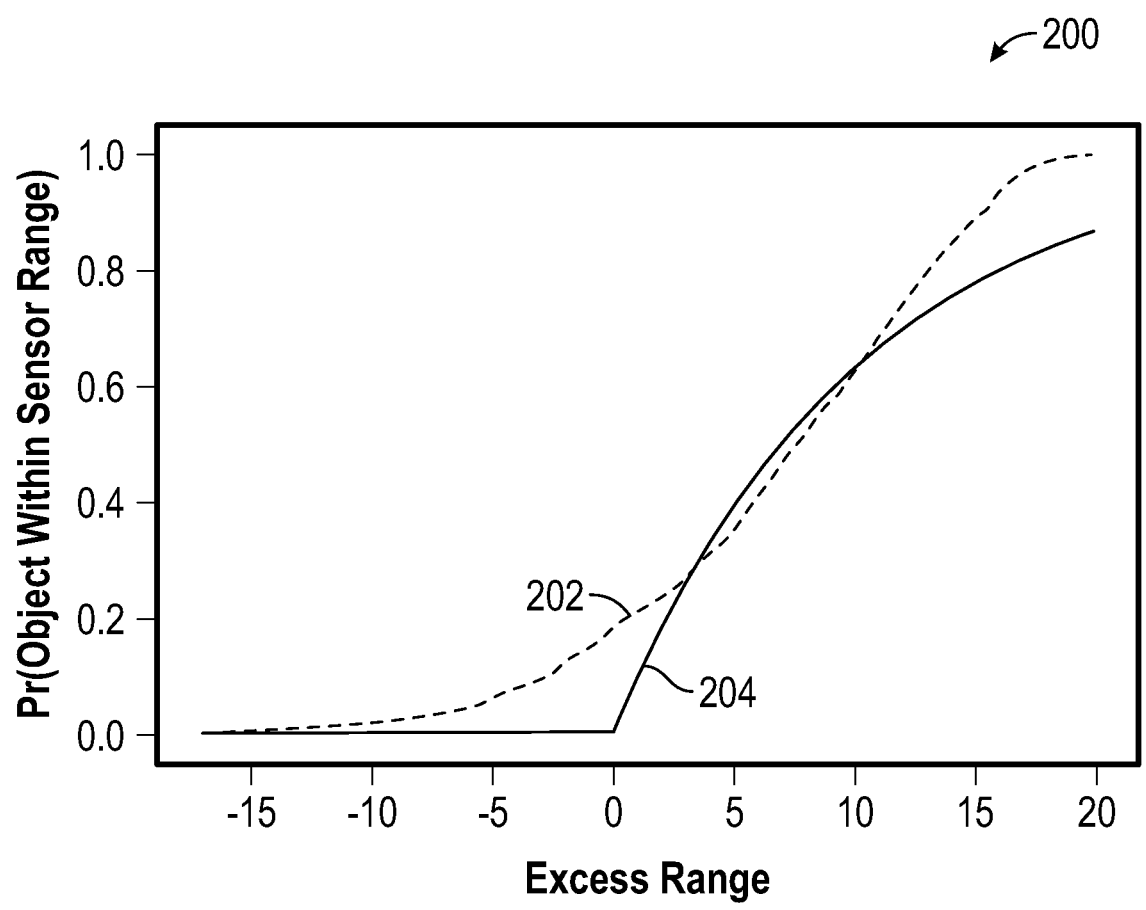
FIG. 6 depicts an example of a probability function and a utility function used to generate a boundary around a feature of interest.

Another example of generating a probability distribution and/or a geofence or other boundary around a coordinate (e.g., the coordinate 102) or feature of interest incorporates sensing distance. Sensors in vehicles (e.g., data collection vehicles) may have sensing distances (ranges) that are not perfectly known (i.e., somewhat uncertain) due to factors such as intrinsic sensor noise, atmospheric dust and others. In this example, a probability distribution of sensor range (as a function of distance from a coordinate) is produced based on a likelihood of a feature of interest or object being within a sensor range of the vehicle. A utility function is applied to the probability distribution to estimate a certainty equivalent distance as a radius of a geofence or other boundary, and the certainty equivalent distance is converted to a latitude/longitude space to define the geofence or boundary. FIG. 6 is a graph 200 that includes a curve 202 representing an example of a cumulative probability distribution of a probability that an object is within a sensor's range (Pr(Object Within Sensor Range)), as a function of Excess Range (where a negative value indicates that the object is outside of the range). Curve 204 represents an example of a utility function used to find the certainty equivalent distance.

Figure 7:
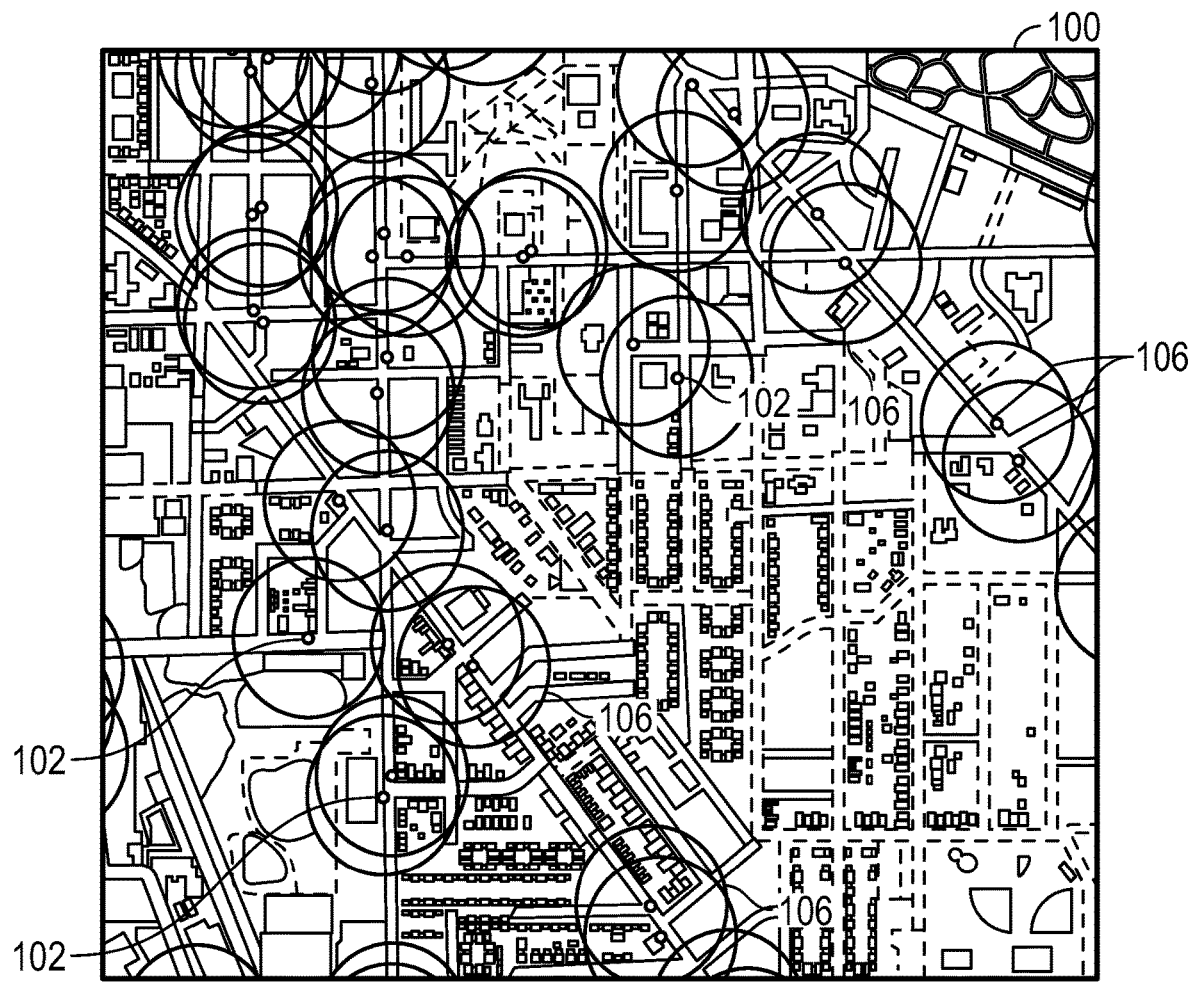
FIG. 7 depicts an example of a cluster of coordinates and respective boundaries on a map region.

When respective geofences for each coordinate 102 are defined, they may be combined to generate a bounded region ("blob"), which may be a geometric region or a region corresponding to a network of road segments and/or routes. FIG. 7 depicts an example including a plurality of respective boundaries (e.g., individual geofences 106), each of which are defined around a respective coordinate 102.

The bounded region (blob) may be defined in a number of ways based on the individual respective geofences. For example, circular geofences can be combined directly to create an overall geometric boundary that encompasses the geofences. In other examples, a smoothing process using the certainty equivalent distance and/or geofences is performed. In a further example, geofences are used to query or identify road segments that intersect the geofences, and a bounded region (visualized as a homogeneous blob or network/web of routes) is applied to include the road segments and connections therebetween.

In an embodiment, a defined region is generated using a cellular automaton-based procedure, in which a geographic region is discretized into a grid of cells, each of which can have an off state and an on-state (e.g., dead or alive, one or zero, etc.). An initial set of cells is selected, and a set of cells defined relative to each cell (a neighborhood) is successively updated (a generation) to grow a region of cells having the on state. The region of activated or "on" cells can be considered an evolutionary pattern.

For example, given a set of seed coordinates and a distance threshold, a map region is discretized by creating a discretization (e.g., grid) or utilizing a preexisting discretization (e.g., geohashing). The haversine distance from each discretization to the nearest seed coordinate is calculated. For each discretization, each cell whose distance-to-nearest-seed is less than the supplied distance threshold is activated or flagged as included within a geofence or boundary. Given a kernel size, the discretization is scanned for specified patterns and the state of the cells is reassessed within the kernel based on some transformation rule. This process is repeated for a number of iterations or generations, and then the resulting boundary (e.g., geofence) is extracted.

Figure 8A:
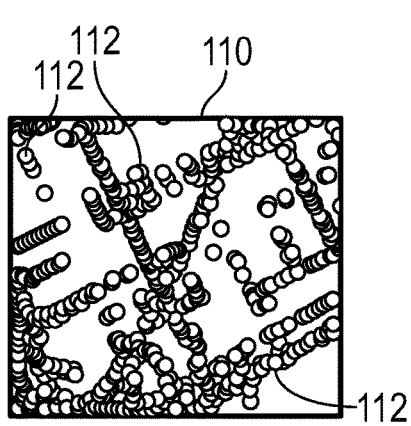
FIGS. 8A-8C depict a discretized region of a map including a grid of cellular automata (cells), and illustrates an example of generating an evolutionary pattern of activated cells, in accordance with an exemplary embodiment.
Figure 8B:
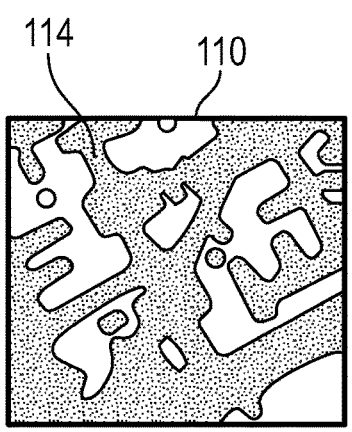
Figure 8C:
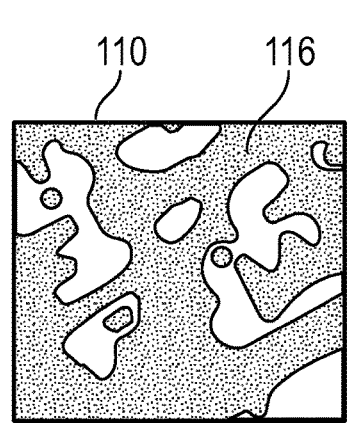

FIGS. 8A-C and 9A-C illustrate an example of an automaton-based process for determining a boundary for a defined region. FIG. 8A shows a discretized section 110 of a map that is discretized into cells 112. In an initial state (t=1), cells 112 are initially activated that are within the distance threshold. As each generation proceeds, additional cells are activated based on the seed coordinates and kernel. FIG. 8B shows a region 114 in which the cells have been activated after four generations. After a given number (n) of generations, cells are activated/deactivated, resulting in an activated region 116 corresponding to an evolutionary pattern (FIG. 8C).

Figure 9B:
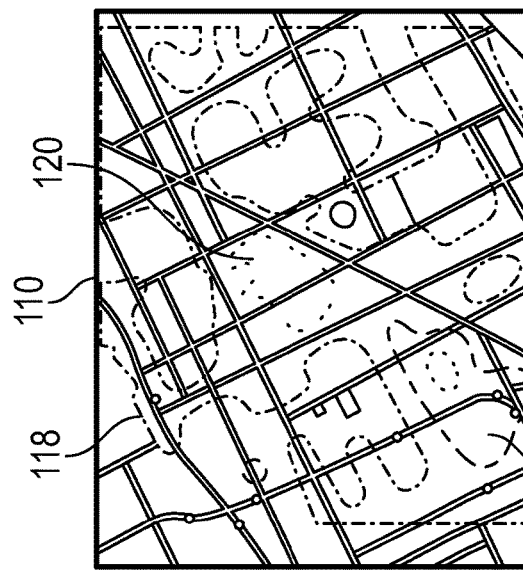
FIGS. 9A-9C depict the map region of FIGS. 7A-7C, and illustrate an example of generating map visualizations based on cellular automata, in accordance with an exemplary embodiment.
Figure 9A:
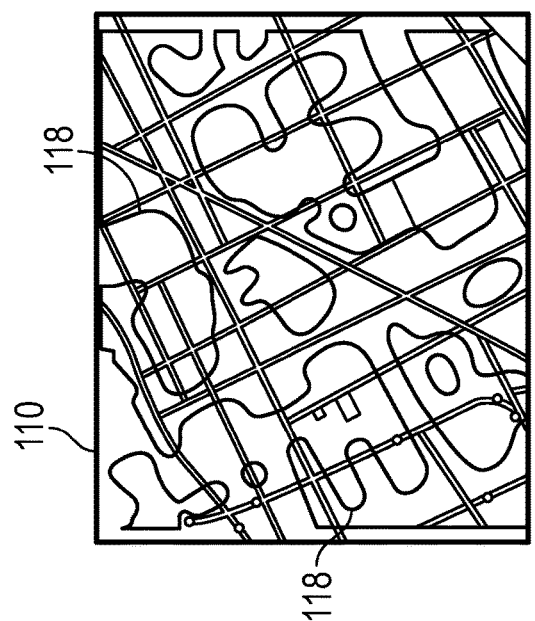
Figure 9C:
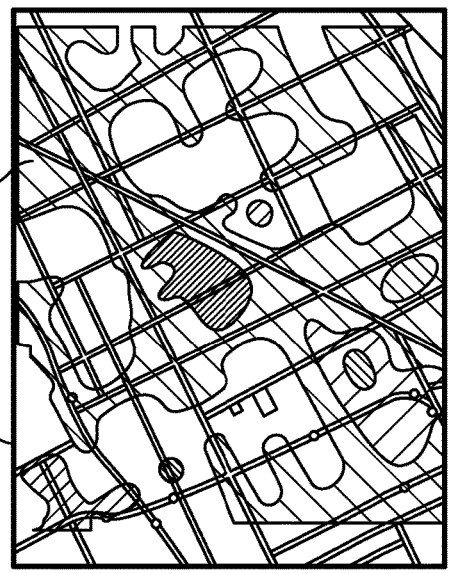

Referring to FIGS. 9A-9C, once the region 116 has been defined, edge conditions are extracted and a boundary 118 is overlaid onto the map section 110 (FIG. 9A), and different shapes 120, 122 are isolated from the boundary 118 (FIG. 9B). At FIG. 9C, the final bounded region is converted into a geometry to generate a one or multiple defined regions 124. The regions 124 may be color-coded based on, for example, execution intent and/or statistical characteristics.

In various embodiment, defined regions are determined using a clustering method to determine a defined region (e.g., based on uncertainty using the above methods), and a route optimization algorithm is used to select a plurality of possible or optimized routes that connect clustered coordinates within the defined region. The defined region may be defined by a geofence or other boundary.

Figure 10:
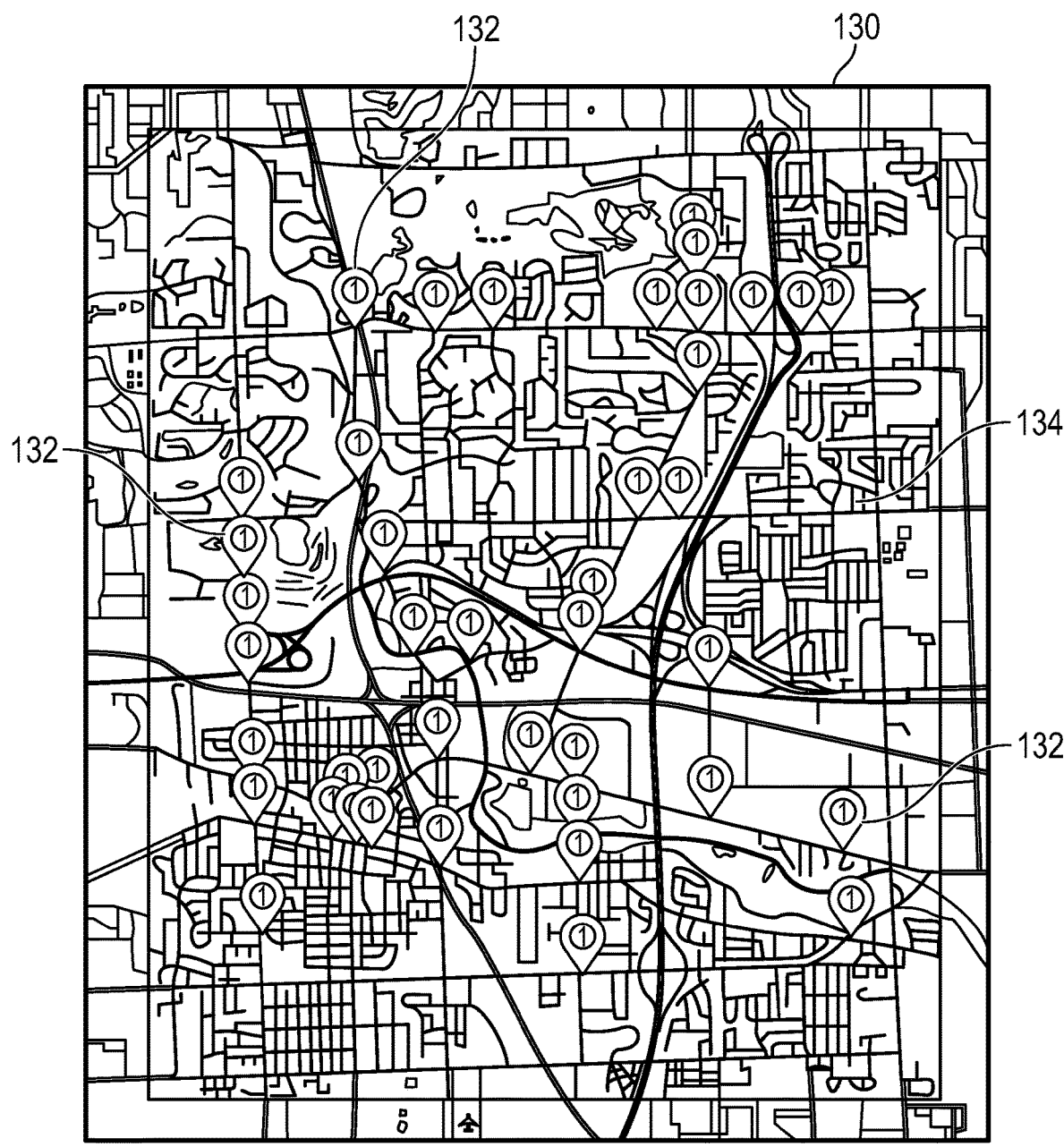
FIG. 10 depicts a map region and a road network, the map region including a set of clustered coordinates, used in an example of generating a map visualization, in accordance with an exemplary embodiment.
Figure 11:
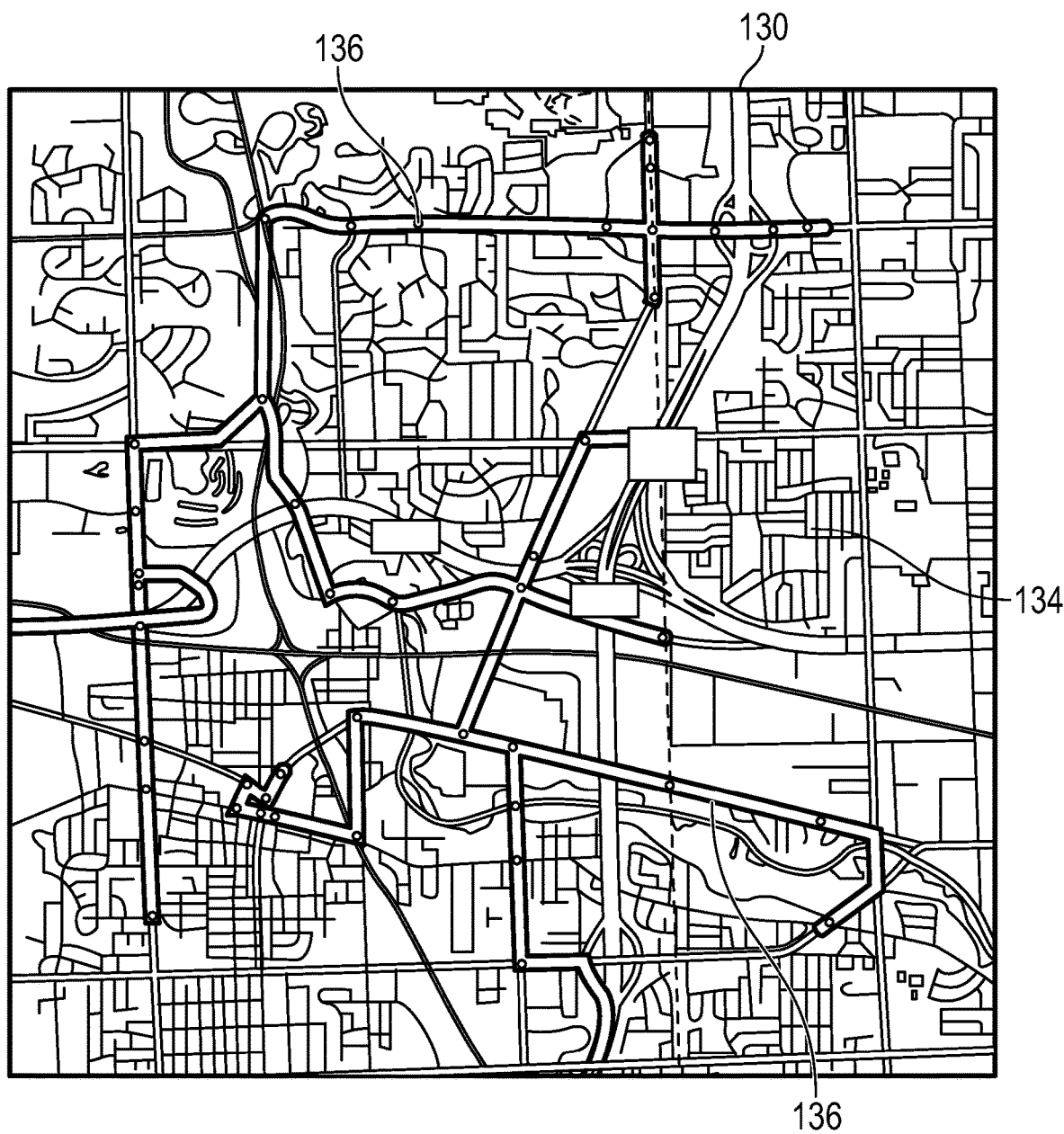
FIG. 11 depicts a set of routes selected based on a route optimization algorithm applied to the map region of FIG. 10, in accordance with an exemplary embodiment.
Figure 12:
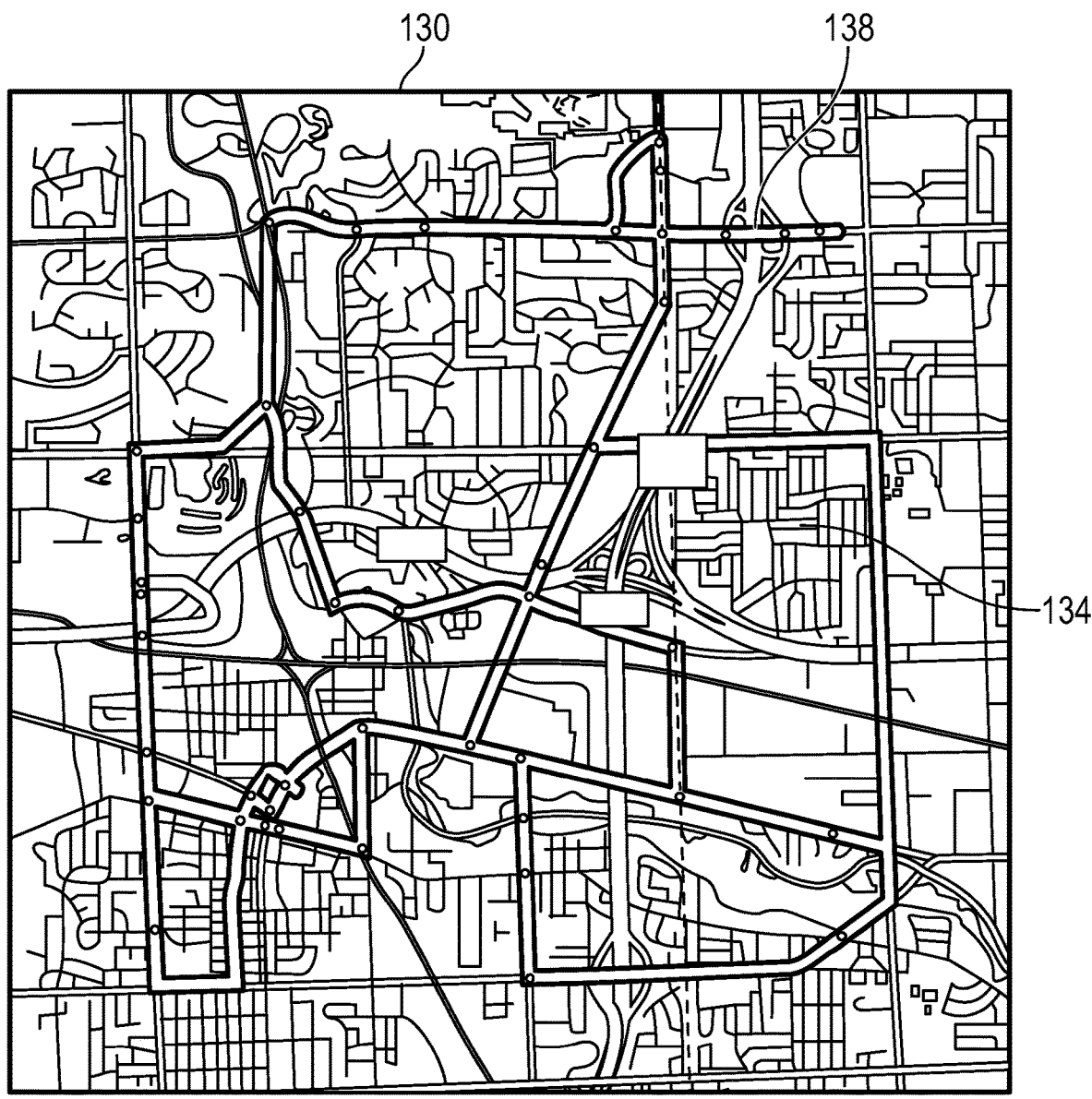
FIG. 12 depicts the map region of FIGS. 10 and 11, and shows an example of a completed map visualization, in accordance with an exemplary embodiment.

In an embodiment, an example of which is shown in FIGS. 10-12, generation of a blob or defined region is based on a Steiner tree-based optimization method. The method of this embodiment includes acquiring a plurality of coordinates, such as waypoints on a map. For example, FIG. 10 shows a section 130 of a map that was selected based on a cluster of waypoint coordinates 132 over a road network 134.

For each cluster, a geofence or other boundary containing the clustered coordinates is generated by solving the Steiner tree problem (e.g., the minimum spanning tree problem, MSP, etc.) using a travel cost matrix and buffering the resulting line geometries. The travel cost matrix is constructed as a square matrix where each element is the minimum network travel time between a corresponding pair of points (or other cost).

An example of a travel cost matrix is shown below, in which a cost value (c) is input that represents the minimum cost to traverse between two points or coordinates. The cost c may correspond to the total distance needed to travel between points via the road network, travel time, etc. In the following example, the cost matrix is based on three coordinates i, j and k, however it is noted that the cost matrix can include any number of point (often a large number of points):

$$\begin{bmatrix} 0 & c_{ji} & c_{ki} \\ c_{ij} & 0 & c_{kj} \\ c_{ik} & c_{jk} & 0 \end{bmatrix}$$

For example, the travel cost matrix is used to solve the minimum spanning tree problem based on the following:

$$\min \sum\nolimits_{(i,j) \in E} c_{ij} x_{ij}$$
$$\text{s.t. } x \in S$$

The solution results in a network of routes that connect each coordinate are calculated. FIG. 11 shows an example of a Steiner tree geometry, in which the calculated routes are represented by highlighting or emphasis. The Steiner tree geometry in this example is represented by highlighted road segments 136 of the road network 134.

Discontinuities (dead ends) at Steiner tree leaves within a geofence or boundary are mended together using, for example, shortest path (SP) route geometries between each leaf and its nearest leaf in terms of travel cost, geometrically unioned with a traveling salesperson (TSP) route geometry between all leaves. FIG. 12 shows a completed region 138 highlighting a network of routes, including Steiner tree routes (road segments 136) and connections between dead ends.

The methods descried herein may also include various procedures for connecting disparate regions. In an embodiment, a clustering and route optimization method is performed to determine optimal routes between various defined regions, and/or an optimal order of the regions.

Coordinates may be selected as discussed above, and a defined or bounded region is generated for each cluster of coordinates. The defined region may be determined using any of the methods described herein. An optimization route algorithm, such as a traveling salesperson (TSP) routing algorithm, may be performed to identify optimal routes and points of entry.

Figure 13:
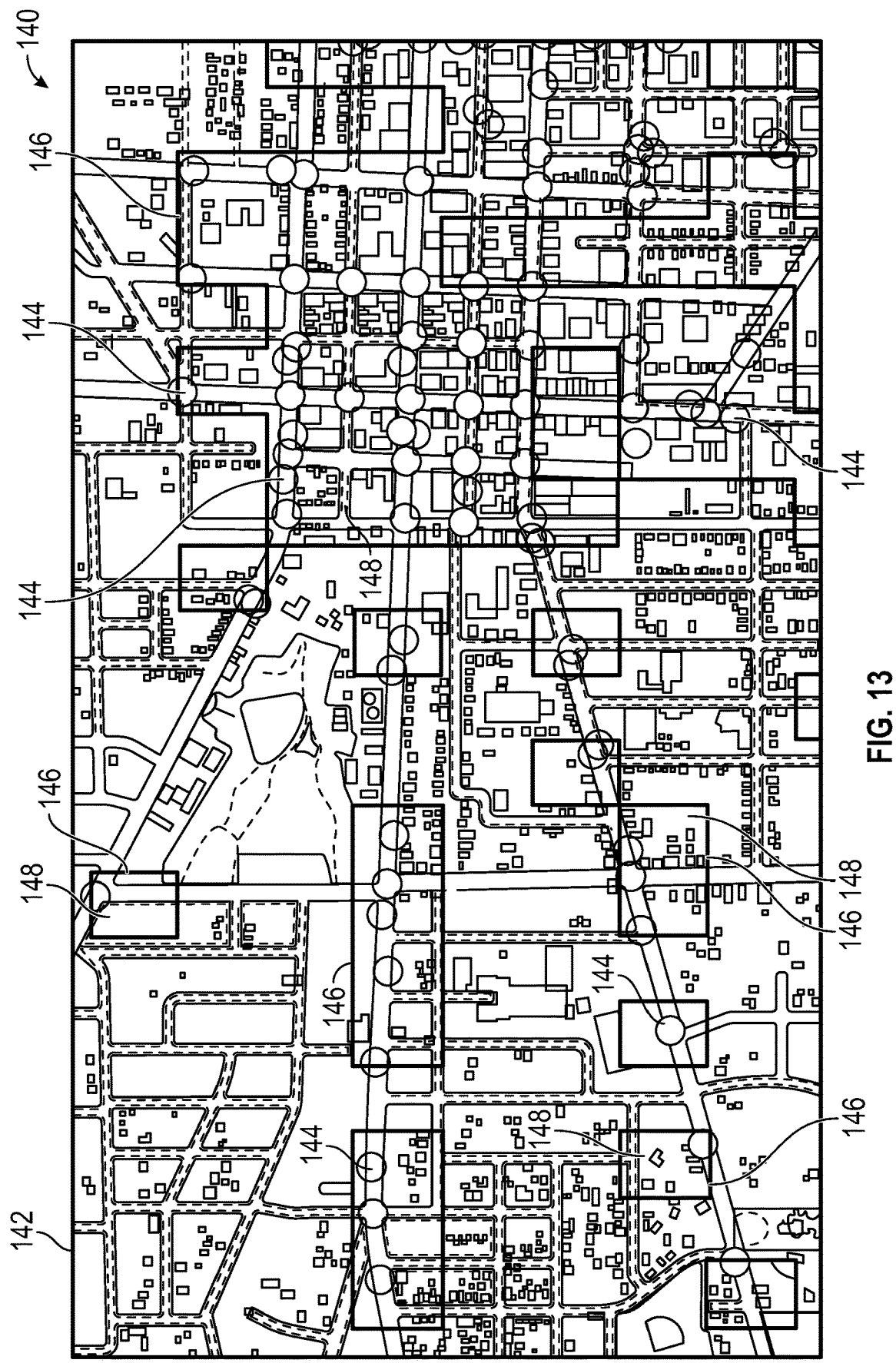
FIG. 13 depicts a map region including coordinates and boundaries generated based on geofences, as part of an example of a process of generating map visualizations, in accordance with an exemplary embodiment.
Figure 14:
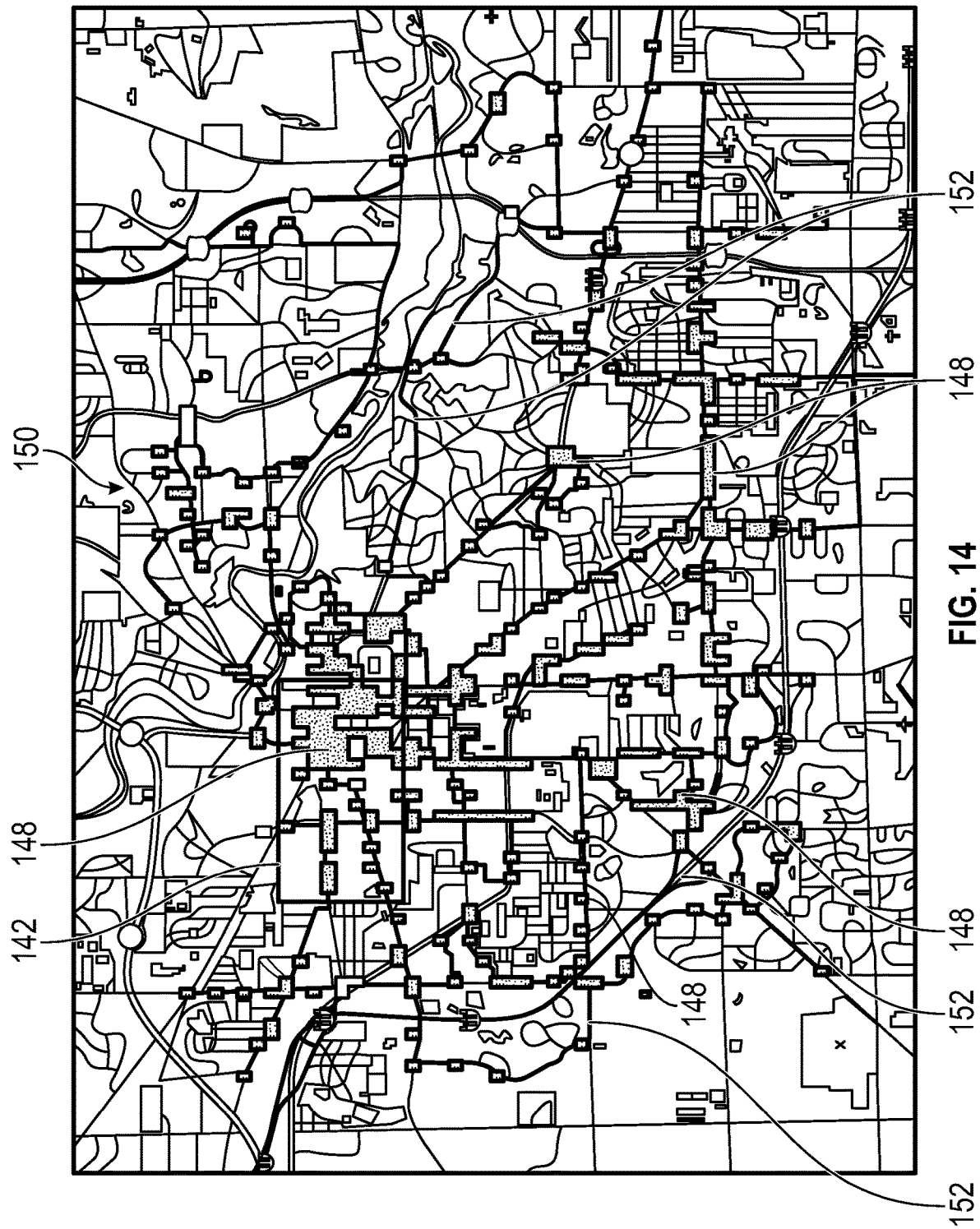
FIG. 14 depicts a map visualization of a defined region that includes a plurality of individual bounded regions determined via the process of FIG. 13, in accordance with an exemplary embodiment, the bounded regions connected by highlighted routes.
Figure 15:
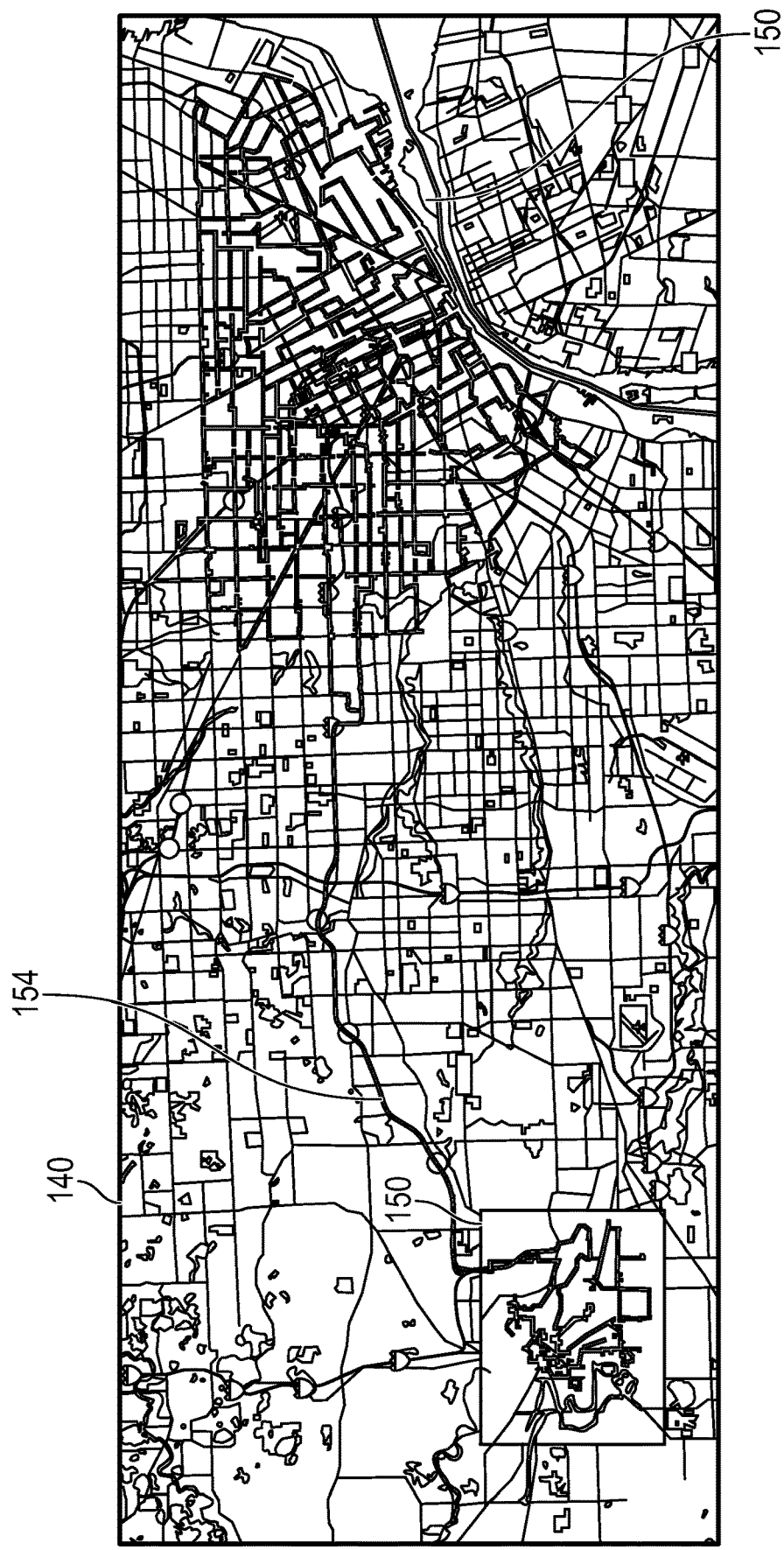
FIG. 15 depicts an example of visualizations of multiple defined regions and an optimal route connecting the regions, in accordance with an exemplary embodiment.

FIGS. 13-15 depict an example of a procedure for connecting disparate regions. In this example, geofences or other boundaries are generated that include clusters of coordinates, each boundary having an extent based on a level of uncertainty associated with the coordinates in a given region. The procedure is performed in conjunction with various sections of a map 140.

Referring to FIG. 13, in this example, points (e.g., coordinates) or areas (e.g., having a cluster of points) are encoded by geohashing, and clusters of geohashes (cells) are determined. A geofence is defined to bound each geohash cluster. FIG. 13 shows a section 142 of the map 140, in which coordinates 144 are binned into geohashes at a precision (e.g., a geohash level) as specified by a user. The geohash precision may be selected based on a level of uncertainty. Clusters of geohashes are bound by geofences 146 to generate bounded areas 148 (individual or respective defined regions). The bounded areas 148 are clustered to result in a defined region 150 having a plurality of individual bounded areas.

As shown in FIG. 14, discontinuous bounded areas 148 may be connected using a traveling salesperson (TSP) routing algorithm to identify routes therebetween and an order for visiting individual bounded areas 148. For example, a TSP cost matrix is constructed as a square matrix where each element is the minimum of pairwise distances between geohash centroids of respective pairs of cluster manifolds (bounded areas 148). FIG. 14 shows routes 152 between areas 148 as determined by TSP. The individual areas and routes make up the overall defined region 150.

Discontinuous regions 150 may then be connected by determining one or more routes 154 therebetween, as shown in FIG. 15. The routes 154 may be connected by determining optimal entry points into each region.

For connection of disparate defined regions or blobs, in an embodiment, routes are calculated that allow a driver to traverse a plurality of defined regions. The routes may be determined by traveling salesman or other route optimization. In an embodiment, the routes are selected so that a route connects to each defined region at an optimal exit and entry point.

An embodiment of a method for identifying optimal exit and entry points within pairs of defined regions, and determining optimal routes connecting these points, includes calculating a pairwise cost matrix where each element is the minimum of pairwise distances between points of interest within a respective pair of defined regions.

Figure 16:
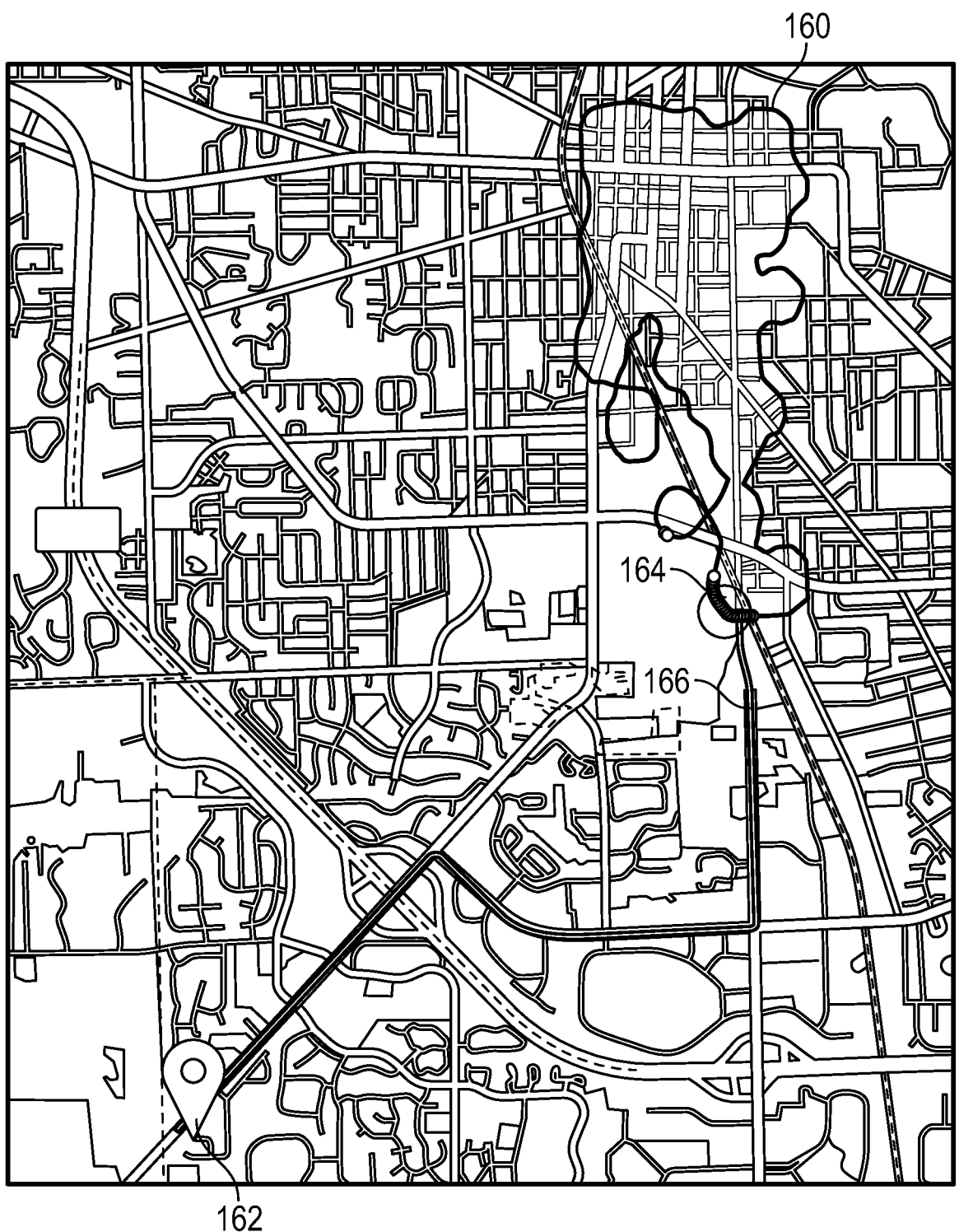
FIG. 16 depicts a map region and an example of calculation of a route and entry point to a defined region corresponding to a map visualization, in accordance with an exemplary embodiment.

For example, as shown in FIG. 16, an optimal entry point 164 into a defined region 160 is found from a fixed point 162. The optimal entry point 164 is found based on determining a route 166 that results in a minimal travel time from the fixed point 162 to the defined region 160.

Figure 17:
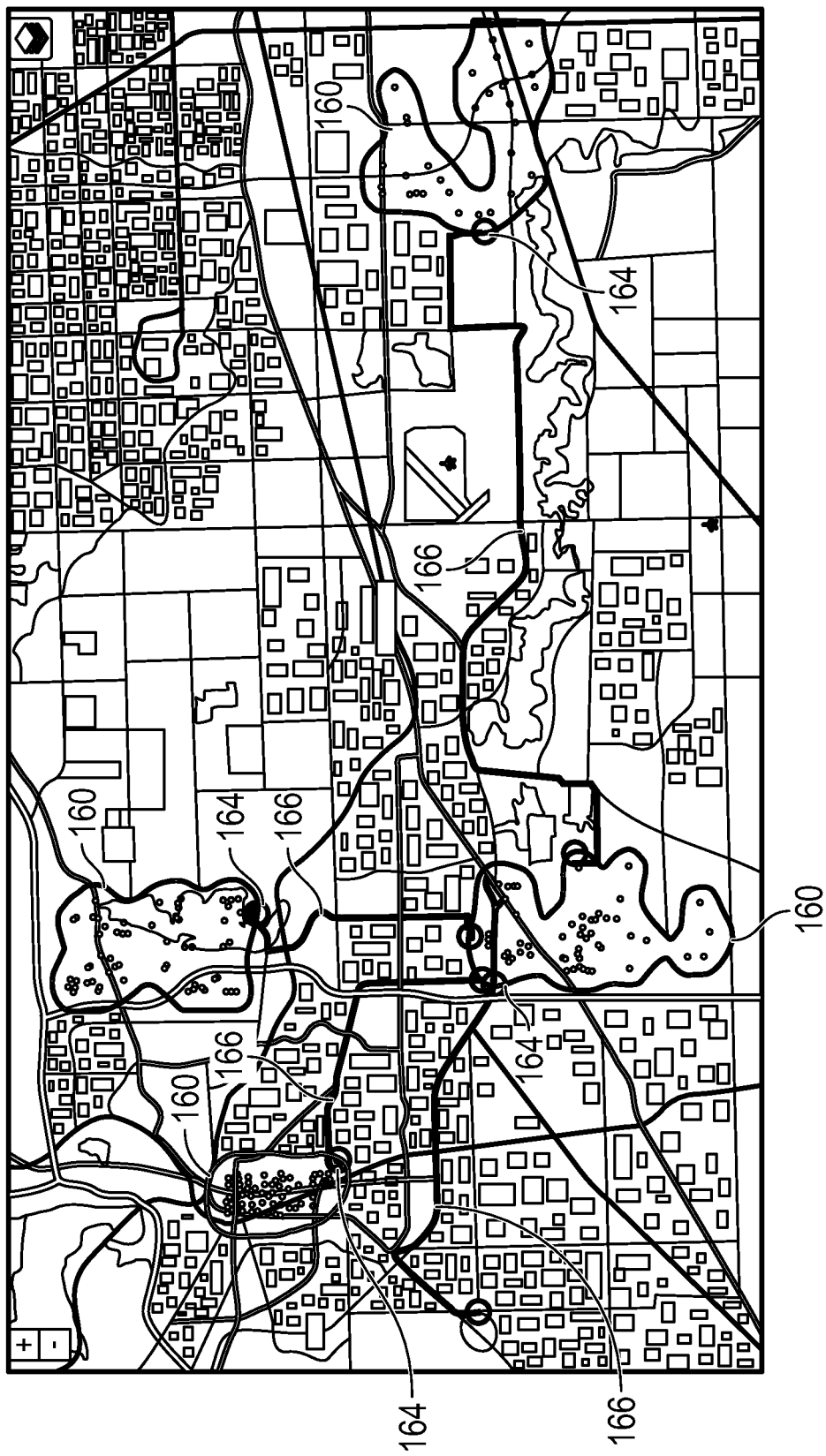
FIG. 17 depicts a map region and an example of calculation of optimal routes and entry points to multiple defined regions corresponding to multiple map visualizations, in accordance with an exemplary embodiment.

If there are multiple defined regions 160 (FIG. 17), the optimal entry points are determined for each region 160, and a TSP cost matrix is used, where c is the minimum cost (travel time) to traverse from one region 160 to another.

In an embodiment, one or more defined regions may be cross-referenced with various regional statistics. This could be used to combine defined regions with additional criteria. For example, a region or blob is generated to predict areas of highly dynamic objects of interest. A statistical data set representing a statistical characteristic is acquired, and each statistical data point in a data set is correlated to a point in a defined region and assigned a weighted value based on the statistical data (e.g., density). The weighted values are then used to identify regions or subsets of regions, each having a respective probability of finding an object of interest.

Figure 18:
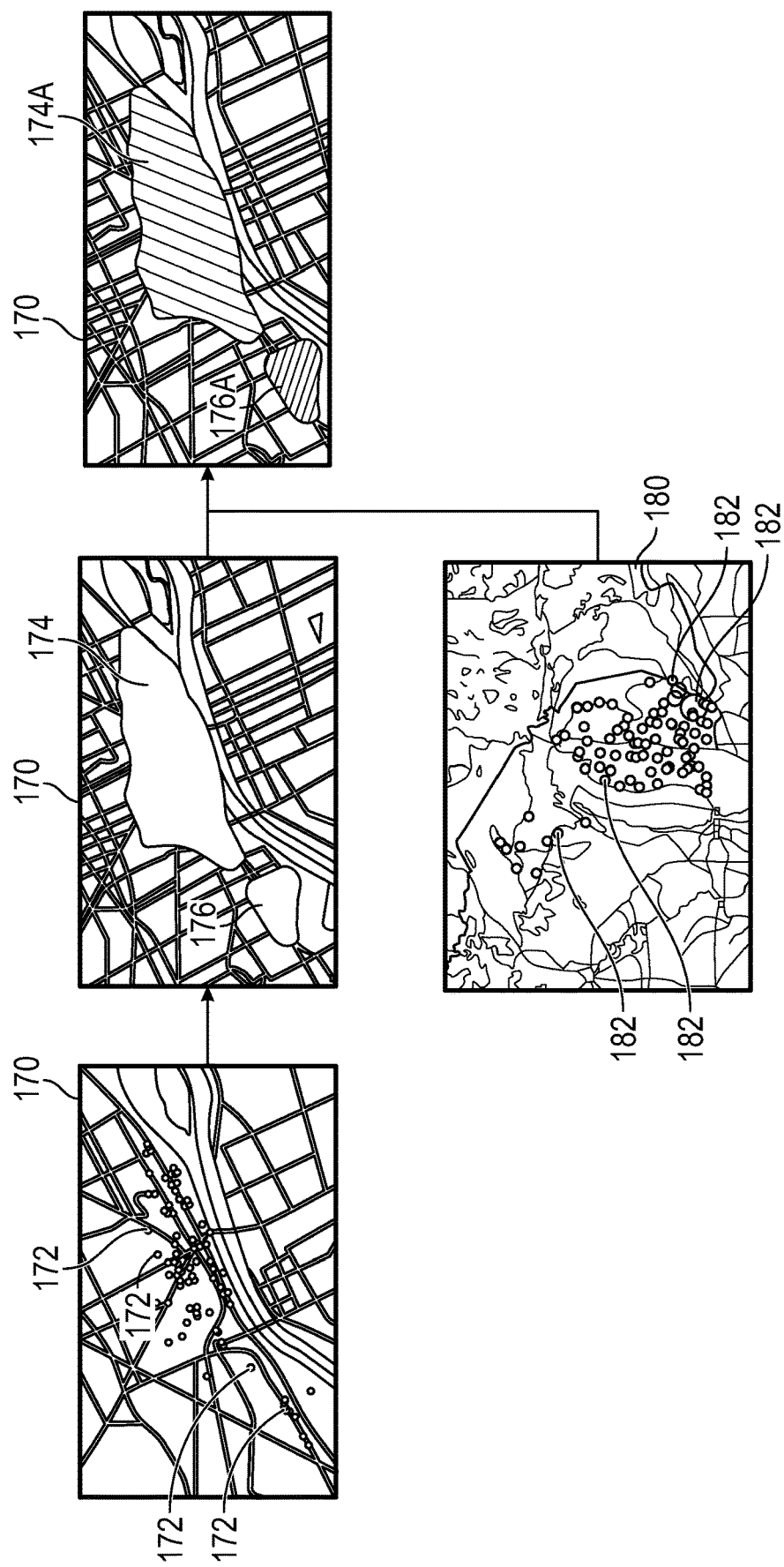
FIG. 18 depicts an example of generating a map visualization including a visual attribute representing a statistical characteristic of a defined region, in accordance with an exemplary embodiment.

FIG. 18 illustrates an example of cross-referencing regions using statistical data. FIG. 18 shows a map 170 that includes a set of coordinates 172 of known locations of crosswalks (crosswalk dataset). Crosswalk blobs 174 and 176 are generated by any of the methods described herein. The regions corresponding to the crosswalk blobs 174 and 176 are cross-referenced with a population density dataset, represented in a map 180 that includes population density data 182. Each blob (or part thereof) is visualized in a manner that conveys a population density level, e.g., by color. In the example of FIG. 18, blob 174 has a higher population density and is assigned a color (e.g., a darker color such as red), resulting in a cross-referenced blob 174A. Blob 176 has a lower population density and is assigned a different color (e.g., a lighter shade such as yellow or orange), resulting in a cross-referenced blob 176A. It is noted that the method illustrated by FIG. 18 can be performed in conjunction with any statistical characteristic(s), and is not limited to any specific examples.

In an embodiment, a processing device (e.g., vehicle on-board computer) is configured to perform a method of tracking coverage of a defined region in real time. This may be applicable in various contexts, such as a taxi driver traversing an area to find customers, or a data collection vehicle that needs to traverse a road network in a defined region.

Road coverage (i.e., the roads that have already been traversed as desired) is tracked in real time, for example, by inferring an underlying road network from an initially loaded blob and using real-time GPS and heading information to calculate distance covered.

In another example, using a map matching mechanism, base map tiles or geohash elements are called from a pre-existing database using real-time coordinates key calls. Only map tiles of road-segments underneath a blob are loaded, and multiple instances of the same tile can be loaded to account for multiple visits to the same location. A counter may be provided that is incremented if the vehicle visits a location that still exists within the loaded database.

Figure 19:
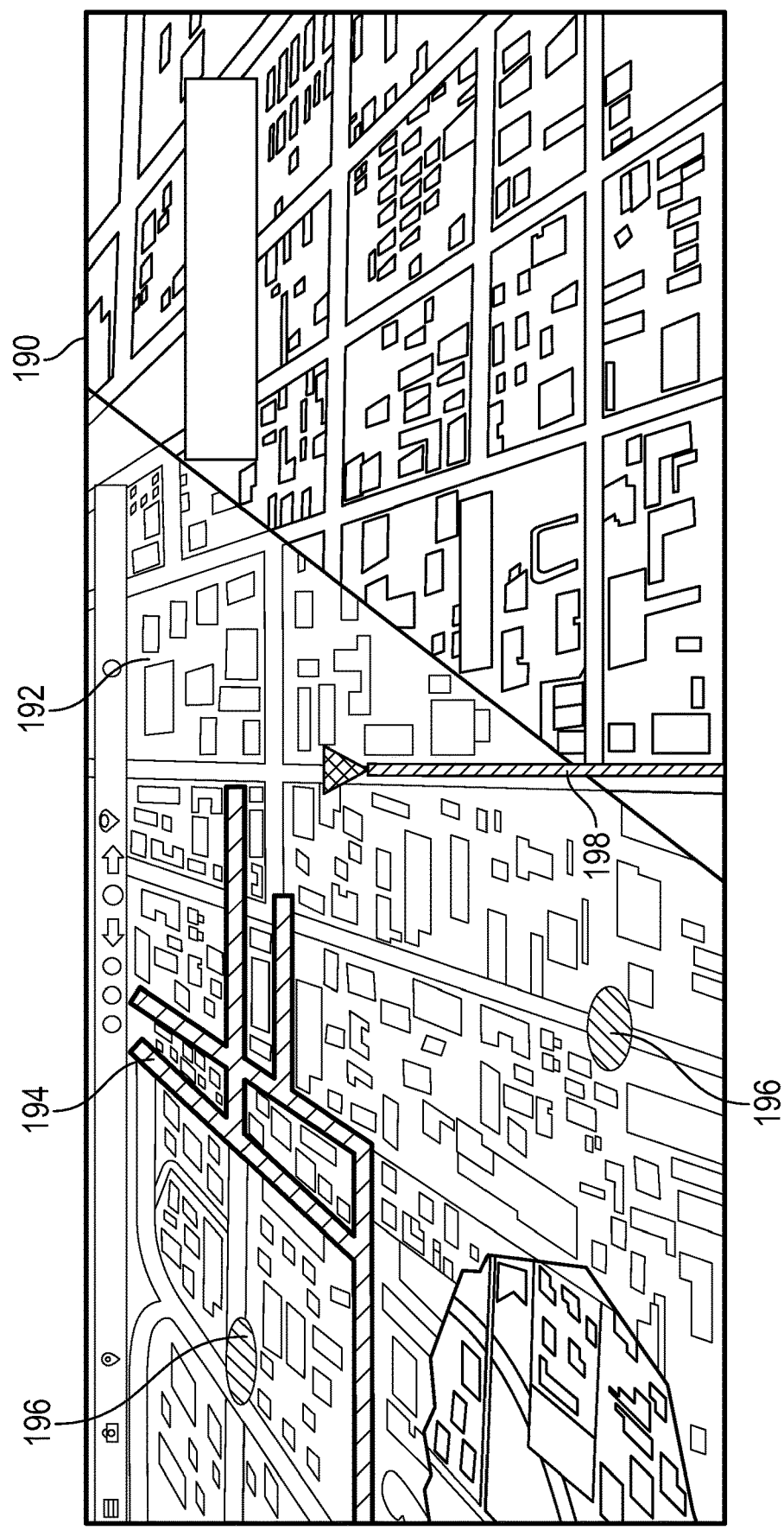
FIG. 19 is a map display showing aspects of an example of a process of tracking a vehicle's traversal of a region of interest corresponding to a map visualization, in accordance with an exemplary embodiment.

A defined region visualization may be overlayed on map tiles with a displayed vehicle trace that can show a driver which routes have already been traversed. The vehicle traces can be visually distinguished to display to the driver routes that require special execution. The traces can be displayed in various colors or other attributes that signify an action that needs to be carried out at the location FIG. 19 shows an example of a real time map display 190 that is updated as a vehicle travels within a defined region or blob. The blob is overlaid with a transparent color attribute 192. Roads to be covered more than once are represented by red lines 194, areas to linger in are represented by yellow circles or other shapes 196. The remaining region, which is only covered by the color attribute 192, indicates that the roads therein are covered once. The road currently being actively covered may be provide with a green line 198. The colors described here are for illustrative purposes and are not intended to be limiting.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for determining and presenting visual representations, comprising:
   at least one processor including a receiving module configured to receive a set of coordinates representing one or more geographic locations of one or more features of interest;
   the at least one processor including an analysis module configured to define a region corresponding to the set of coordinates, the region having an extent based on a level of uncertainty associated with the one or more features of interest, wherein the analysis module is configured to acquire a probability distribution describing a probability of the one or more features of interest occurring at a given location, the probability distribution defined relative to a coordinate; and
   the at least one processor including a visualization module configured to generate a visual representation of the defined region and present the visual representation on a map, wherein the visual representation includes one or more visual features representing the probability distribution as a function of distance from the coordinate.

2. The system of claim 1, wherein the extent of the defined region is defined by at least one of: a boundary enclosing the defined region, and a network of selected routes traversing the defined region and connecting the set of coordinates.

3. The system of claim 2, wherein the boundary is determined based on calculating a respective boundary around each coordinate of the set of coordinates, and combining the respective boundaries into the boundary enclosing the defined region, wherein an area of each respective boundary is based on the level of uncertainty and the probability distribution.

4. The system of claim 3, wherein the one or more visual features show variations in the probability of the one or more features of interest occurring.

5. The system of claim 1, wherein the defined region is defined based on generating an evolutionary pattern of cellular automata, the pattern based on the level of uncertainty.

6. The system of claim 1, wherein the set of coordinates is a plurality of coordinates, and the analysis module is configured to determine the defined region based on clustering the plurality of coordinates into one or more clusters, and defining a respective region for each of the one or more clusters.

7. The system of claim 6, wherein the analysis module is further configured to select a network of routes connecting each coordinate in a cluster based on a route optimization algorithm.

8. The system of claim 1, wherein the defined region includes a plurality of disparate regions, and the analysis module is configured to determine an optimal entry point into each disparate region, and determine a route between the plurality of disparate regions based on the optimal entry points.

9. The system of claim 1, wherein the analysis module is further configured to cross-reference the defined region with a statistical characteristic of a geographic region including the defined region, and the visualization module is configured to apply a visual attribute indicative of the statistical characteristic to the visual representation, and overlay the region with the visual representation indicative of the statistical characteristic.

10. A method of determining and presenting visual representations, comprising:
    receiving a set of coordinates representing one or more geographic locations of one or more features of interest;
    defining a region corresponding to the set of coordinates, the region having an extent based on a level of uncertainty associated with the one or more features of interest;
    acquiring a probability distribution describing a probability of the one or more features of interest occurring at a given location, the probability distribution defined relative to a coordinate; and
    generating a visual representation of the defined region and presenting the visual representation on a map, wherein the visual representation includes one or more visual features representing the probability distribution as a function of distance from the coordinate.

11. The method of claim 10, wherein the extent of the defined region is defined by at least one of: a boundary enclosing the defined region, and a network of selected routes traversing the defined region and connecting the set of coordinates.

12. The method of claim 11, wherein the boundary is determined based on calculating a respective boundary around each coordinate of the set of coordinates, and combining the respective boundaries into the boundary enclosing the defined region, wherein an area of each respective boundary is based on the level of uncertainty and the probability distribution.

13. The method of claim 12, wherein the probability distribution is represented by a set of contour lines, each contour line representing distances associated with a given probability.

14. The method of claim 10, wherein the defined region is defined based on generating an evolutionary pattern of cellular automata, the pattern based on the level of uncertainty.

15. The method of claim 10, wherein the set of coordinates is a plurality of coordinates, and defining the region includes clustering the plurality of coordinates into one or more clusters, and defining a respective region for each of the one or more clusters.

16. The method of claim 15, further comprising selecting a network of routes connecting each coordinate in a cluster based on a route optimization algorithm.

17. A vehicle system comprising:
    a memory having computer readable instructions; and
    a processing device for executing the computer readable instructions, the computer readable instructions controlling the processing device to perform a method comprising:
    receiving a set of coordinates representing one or more geographic locations of one or more features of interest;

defining a region corresponding to the set of coordinates, the region having an extent based on a level of uncertainty associated with the one or more features of interest;

acquiring a probability distribution describing a probability of the one or more features of interest occurring at a given location, the probability distribution defined relative to a coordinate; and generating a visual representation of the defined region and presenting the visual representation on a map, wherein the visual representation includes one or more visual features representing the probability distribution as a function of distance from the coordinate.

18. The vehicle system of claim 17, wherein the extent of the defined region is defined by at least one of: a boundary enclosing the defined region, and a network of selected routes traversing the defined region and connecting the set of coordinates.

19. The vehicle system of claim 18, wherein the boundary is determined based on calculating a respective boundary around each coordinate of the set of coordinates, and combining the respective boundaries into the boundary enclosing the defined region, wherein an area of each respective boundary is based on the probability distribution.

20. The vehicle system of claim 17, wherein the set of coordinates is a plurality of coordinates, and defining the region includes clustering the plurality of coordinates into one or more clusters, defining a respective region for each of the one or more clusters, and selecting a network of routes connecting each coordinate in a cluster based on a route optimization algorithm.

* * * * *